United States Patent
Huang et al.

(10) Patent No.: US 12,160,124 B2
(45) Date of Patent: Dec. 3, 2024

(54) WIRELESS POWER AND VOLTAGE REGULATION FOR WIRELESS POWER TRANSFER SYSTEMS

(71) Applicant: Iowa State University Research Foundation, Inc., Ames, IA (US)

(72) Inventors: Cheng Huang, Ames, IA (US); Junyao Tang, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 18/091,856

(22) Filed: Dec. 30, 2022

(65) Prior Publication Data

US 2023/0238829 A1 Jul. 27, 2023

Related U.S. Application Data

(60) Provisional application No. 63/296,076, filed on Jan. 3, 2022.

(51) Int. Cl.
*H02J 50/80* (2016.01)
*H02J 50/12* (2016.01)

(52) U.S. Cl.
CPC ............. *H02J 50/80* (2016.02); *H02J 50/12* (2016.02); *H02J 2310/23* (2020.01)

(58) Field of Classification Search
None
See application file for complete search history.

(56) References Cited

U.S. PATENT DOCUMENTS

| | | | | |
|---|---|---|---|---|
| 5,279,292 A | * | 1/1994 | Baumann | H02J 50/005 607/57 |
| 6,240,318 B1 | * | 5/2001 | Phillips | A61N 1/3787 607/61 |
| 9,954,399 B2 | * | 4/2018 | Toncich | H01F 38/14 |
| 2005/0068019 A1 | * | 3/2005 | Nakamura | H02J 50/80 323/355 |

(Continued)

OTHER PUBLICATIONS

Bhatti, Pamela T., "A 32-Site 4-Channel High-Density Electrode Array for a Cochlear Prosthesis", IEEE Journal of Solid-State Circuits, vol. 41, No. 12, (Dec. 2006), 2965-2973.

(Continued)

*Primary Examiner* — Adi Amrany
(74) *Attorney, Agent, or Firm* — Schwegman Lundberg & Woessner, P.A.

(57) ABSTRACT

A variety of applications can include wireless power and voltage regulation for wireless power transfer systems. A receiver can receive power wirelessly from a transmitter to provide an output voltage. The receiver can regulate the output voltage with respect to a window defining an upper threshold and a lower threshold and can generate a first signal in response to the output voltage exceeding the upper threshold voltage and a second signal in response to the output voltage reducing below the lower threshold voltage. The receiver can change its input impedance and control reception of the power in response to the first and second signals. A transmitter can sense current in the power transistors or the coil of the transmitter in response to the change of input impedance of the receiver. The sensed current can be used to modify the current to the output of the transmitter to adjust the transmitted power.

20 Claims, 15 Drawing Sheets

(56) References Cited

U.S. PATENT DOCUMENTS

| | | | | | |
|---|---|---|---|---|---|
| 2009/0286476 | A1* | 11/2009 | Toncich | ............... | H02J 50/90 |
| | | | | | 455/41.1 |
| 2011/0134673 | A1* | 6/2011 | Ho | ............... | H02M 7/217 |
| | | | | | 363/127 |
| 2014/0285164 | A1* | 9/2014 | Oishi | ............... | G05F 1/46 |
| | | | | | 323/266 |
| 2016/0056640 | A1* | 2/2016 | Mao | ............... | H02J 50/10 |
| | | | | | 307/104 |
| 2016/0087481 | A1* | 3/2016 | Jiang | ............... | H02J 50/10 |
| | | | | | 320/108 |
| 2016/0126749 | A1* | 5/2016 | Shichino | ............... | H02J 50/80 |
| | | | | | 307/104 |
| 2019/0288647 | A1* | 9/2019 | Sivasubramaniam | ............... | |
| | | | | | H03F 3/45475 |
| 2020/0338357 | A1* | 10/2020 | Jiang | ............... | A61N 1/3787 |
| 2021/0359550 | A1* | 11/2021 | Budgett | ............... | H03K 5/01 |

OTHER PUBLICATIONS

Biederman, William, "A 4.78 mm2 Fully-Integrated Neuromodulation SoC Combining 64 Acquisition Channels With Digital Compression and Simultaneous Dual Stimulation", IEEE Journal of Solid-State Circuits, vol. 50, No. 4, (Apr. 2015), 1038-1047.

Chen, Kuanfu, "An Integrated 256-Channel Epiretinal Prosthesis", IEEE Journal of Solid-State Circuits, vol. 45, No. 9, (Sep. 2010), 1946-1955.

Cheng, Lin, "A 6.78-MHz Single-Stage Wireless Power Receiver Using a 3-Mode Reconfigurable Resonant Regulating Rectifier", IEEE Journal of Solid-State Circuits, vol. 52, No. 5, (May 2017), 1412-1419.

Cheng, Lin, "Adaptive on Off Delay-Compensated Active Rectifiers for Wireless Power Transfer Systems", IEEE Journal of Solid-State Circuits, vol. 51, No. 3, (Mar. 2016), 712-723.

Cheng, Lin, "A 40.68-MHz Active Rectifier With Hybrid Adaptive on Off Delay-Compensation Scheme for Biomedical Implantable Device", IEEE Transactions on Circuits and Systems—I: Regular Papers, vol. 67, No. 2, (Feb. 2020), 516-525.

Choi, Jun-Han, "Resonant Regulating Rectifiers (3R) Operating for 6.78 MHz Resonant Wireless Power Transfer (RWPT)", IEEE Journal of Solid State Circuits, vol. 48, No. 12, (Dec. 2013), 2989-3001.

Hong, Sung-Wan, "32.1 A 13.56 MHz Current-Mode Wireless Power and Data Receiver with Efficient Power Extracting Controller and Energy-Shift Keying Technique for Loosely Coupled Implantable Devices", 2020 IEEE International Solid-States Circuits Conference, (2020), p. 486 (3 pages).

Huang, Cheng, "A 13.56-MHz Wireless Power Transfer System With Enhanced Load-Transient Response and Efficiency by Fully Integrated Wireless Constant-Idle-Time Control for Biomedical Implants", IEEE Journal of Solid- State Circuits, vol. 53, No. 2, (Feb. 2018), 538-551.

Huang, Cheng, "A Near-Optimum 13.56 MHz CMOS Active Rectifier With Circuit-Delay Real-Time Calibrations for High-Current Biomedical Implants", IEEE Journal of Solid-State Circuits, vol. 51, No. 8, (Aug. 2016), 1797-1809.

Lee, Hyung-Min, "An Integrated Power-Efficient Active Rectifier With Offset Controlled High Speed Comparators for Inductively Powered Applications", IEEE Transactions on Circuits and Systems—I: Regular Papers, vol. 58, No. 8, (Aug. 2011), 1749-1760.

Li, Xing, "A 13.56 MHz Wireless Power Transfer System With Reconfigurable Resonant Regulating Rectifier and Wireless Power Control for Implantable Medical Devices", IEEE Journal of Solid-State Circuits, vol. 50, No. 4, (Apr. 2015), 978-989.

Li, Xing, "12.8 Wireless Power Transfer System Using Primary Equalizer for Coupling- and Load-Range Extension in Bio-Implant Application", 2015 IEEE International Solid-State Circuits Conference, (2015), p. 228 (3 pages).

Li, Xing, "Power Management Analysis of Inductively-Powered Implants with 1X 2X Reconfigurable Rectifier", IEEE Transactions on Circuits and Systems—I: Regular Papers, vol. 62, No. 3, (Mar. 2015), 617-624.

Lu, Yan, "A 13.56 Mhz CMOS Active Rectifier With Switched-Offset and Compensated Biasing for Biomedical Wireless Power Transfer Systems", IEEE Transactions on Biomedical Circuits and Systems, vol. 8, No. 3, (Jun. 2014), 334-344.

Lu, Yan, "4.2 A 13.56 MHz Fully Integrated 1X 2X Active Rectifier with Compensated Bias Current for Inductively Powered Devices", 2013 IEEE International Solid-State Circuits Conference, (2013), p. 66 (3 pages).

Moh, Kyung-Goo, "12.9 A Fully Integrated 6W Wireless Power Receiver Operating at 6.78 MHz with Magnetic Resonance Coupling", 2015 IEEE International Solid-State Circuits Conference, (2015), p. 230 (3 pages).

Shinoda, Ryota, "Voltage-Boosting Wireless Power Delivery System with Fast Load Tracker by AS-Modulated Sub-Harmonic Resonant Switching", 2012 IEEE International Solid-State Circuits Conference, (2012), p. 288 (3 pages).

Tang, Junyao, "33.6 A Wireless Power Transfer System with Up-to-20% Light-Load Efficiency Enhancement and Instant Dynamic Response by Fully Integrated Wireless Hysteretic Control for Bioimplants", 2021 IEEE International Solid-State Circuits Conference, (2021), p. 470 (3 pages).

Wang, Chwei-Sun, "Power Transfer Capability and Bifurcation Phenomena of Loosely Coupled Inductive Power Transfer Systems", IEEE Transactions on Industrial Electronics, vol. 51, No. 1, (Feb. 2004), 148-157.

Xue, Zhongming, "A 13.56 MHz, 94.1% Peak Efficiency CMOS Active Rectifier With Adaptive Delay Time Control for Wireless Power Transmission Systems", IEEE Journal of Solid-State Circuits, vol. 54, No. 6, (Jun. 2019), 1744-1754.

\* cited by examiner

WIRELESS POWER AND VOLTAGE REGULATION FOR WIRELESS POWER TRANSFER SYSTEMS

CROSS-REFERENCE TO RELATED APPLICATIONS

This application claims the benefit of U.S. Provisional Application No. 63/296,076, filed Jan. 3, 2022, entitled "WIRELESS POWER AND VOLTAGE REGULATION FOR WIRELESS POWER TRANSFER SYSTEMS," which is incorporated herein by reference in its entirety.

FIELD OF THE INVENTION

The invention relates generally to wireless power and voltage regulation, in particular, to wireless power and voltage regulation for wireless power transfer systems.

BACKGROUND

Wireless power transfer (WPT) systems are becoming increasingly popular for more and more applications such as milliwatt-level biomedical applications and watt-level consumer electronics. Because the received power is sensitive to coupling and loading conditions, power or voltage regulations are essential to achieve stable and accurate power delivery, fast transient response, and high end-to-end efficiency. Many existing WPT designs operate in open loop; or achieve voltage regulation but only in the receiver (RX), with the transmitter (TX) remaining unregulated and designed to operate at fully capacity. These WPT designs thus have degraded end-to-end efficiency at light-load conditions. End-to-end efficiency at light-load conditions is important for power management circuits.

Different approaches have been reported to achieve TX regulation. However, some approaches required a wire to close the loop, and some approaches required dedicated wireless modules (2.4 GHz-5 GHz) to establish wireless communication channel, which consumes more power with a higher system complexity and thus more costly. There are approaches utilizing load-shift-keying (LSK) backscattering for TX regulation, which have proven to be a relatively simpler, smaller, and lower-cost solution. However, some of these approaches relied on a significant amount of extra discrete components to close the loop due to linear analog control methodologies used, which still have a high system complexity, large form-factor, and high cost. The linear control methodologies also introduced small-signal bandwidth limitations, which required careful design to ensure stability at different loading or coupling conditions with pressure, volume, and temperature (PVT) variations or component variations, and resulted in compromise in dynamic performance. Another approach introduced a nonlinear constant-idle-time control to eliminate the bandwidth limitations and most of the off-chip components; however, the light-load efficiency still suffered, and this approach still required an extra sensing coil to extract LSK signals that increased the TX coil area significantly.

BRIEF DESCRIPTION OF THE FIGURES

The drawings illustrate generally, by way of example, but not by way of limitation, various embodiments of the invention in which.

DETAILED DESCRIPTION

The following detailed description refers to the accompanying drawings that show, by way of illustration, various embodiments of the invention. These embodiments are described in sufficient detail to enable those of ordinary skill in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
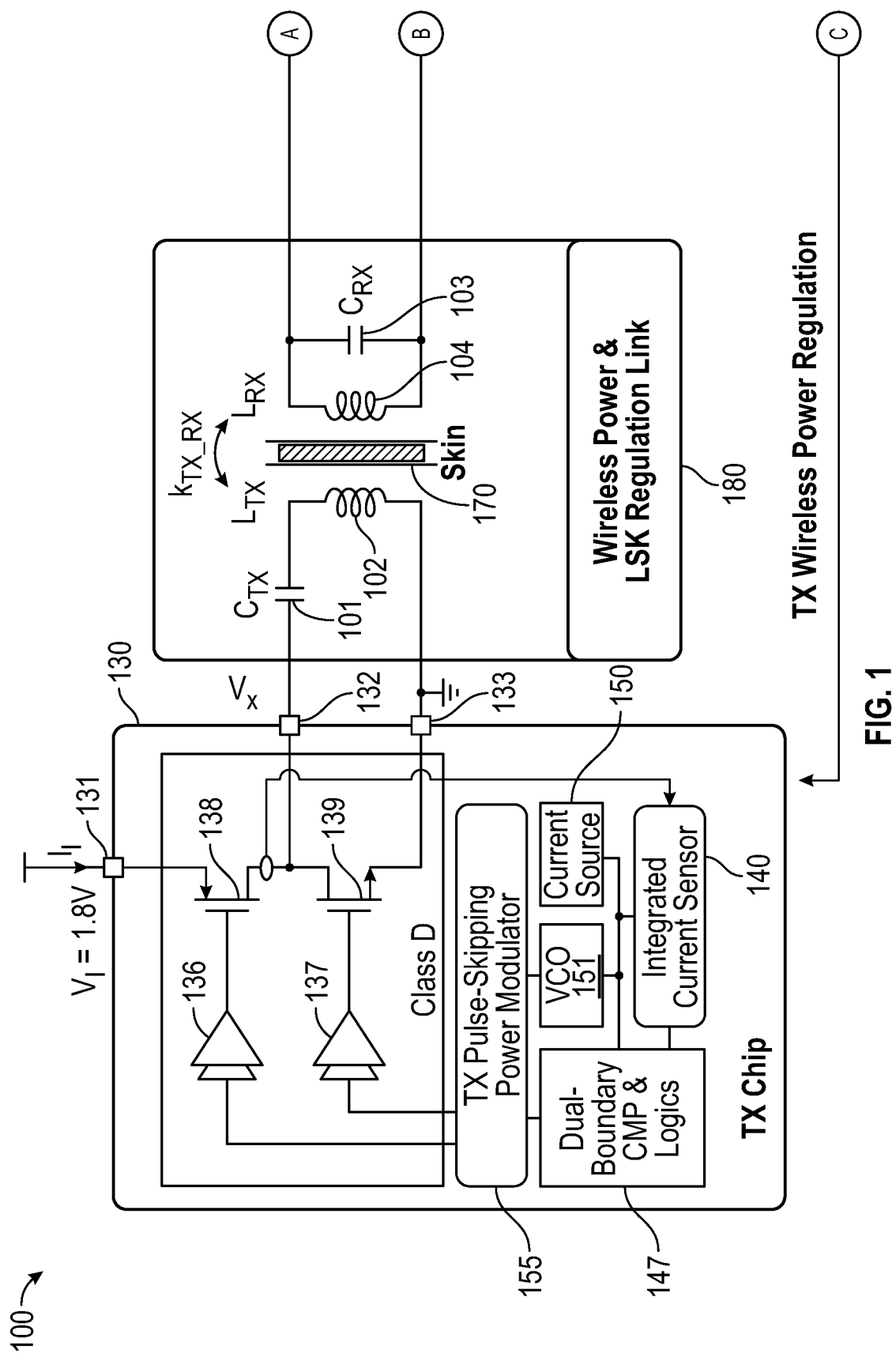
FIG. 1 illustrates an example wireless power transfer system, in accordance with various embodiments.
Figure 1:
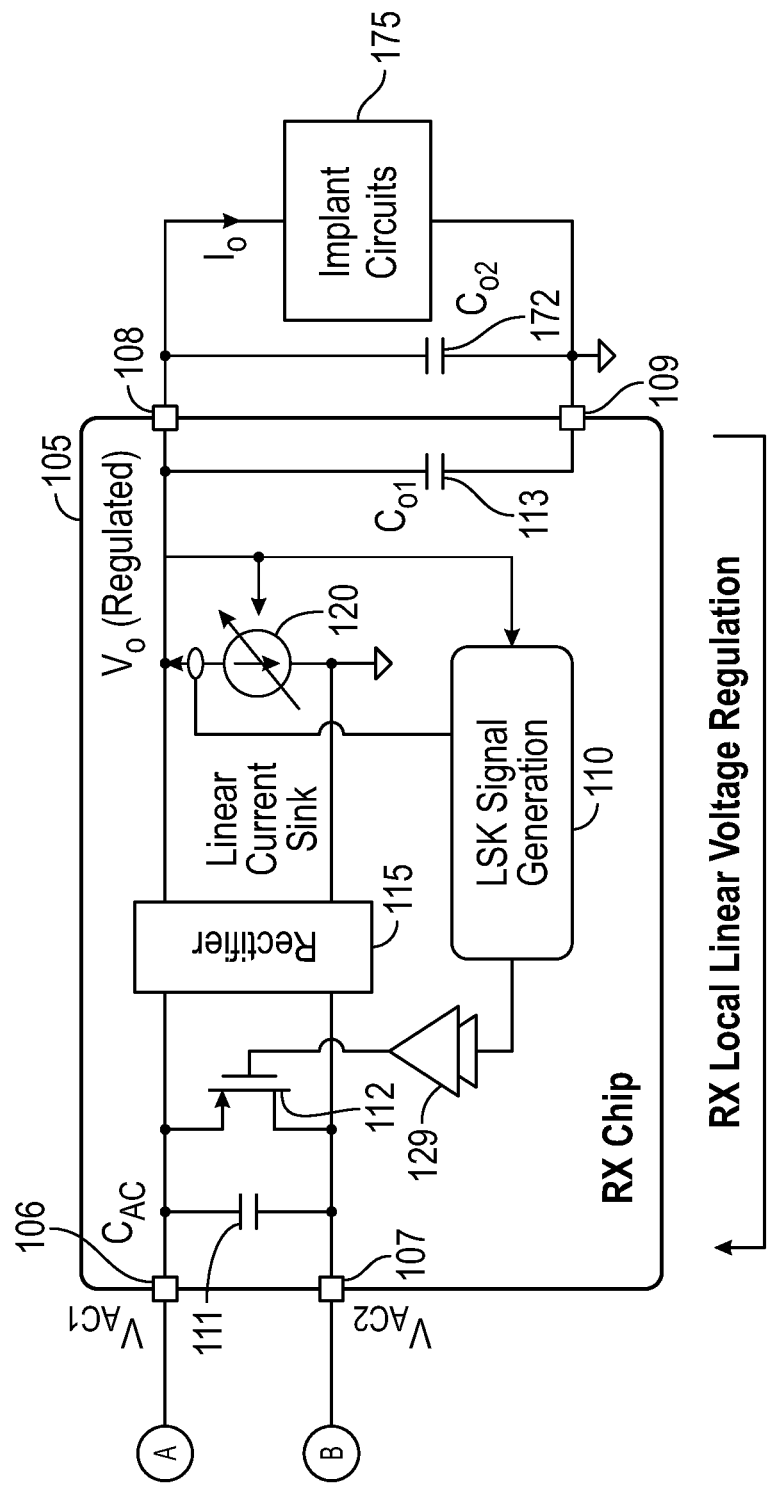

FIG. 1 illustrates an embodiment of an example WPT system 100 that can be implemented to address the abovementioned limitations. WPT system 100 can be constructed with wireless hysteretic control to achieve two levels of regulations: voltage regulation locally in a receiver and power regulation wirelessly through a transmitter. The wireless hysteretic control can provide a closed-loop operation, at both the RX and from RX to TX, to regulate the RX output voltage and maintain optimum efficiency. WPT system 100 can achieve instant load-transient response and enhanced end-to-end light-load efficiency. The local voltage regulation and wireless power regulation can be achieved without using off-chip components, wires, or coils. The hysteretic operation can be implemented in a straightforward manner that is intrinsically stable and insensitive to parasitic elements (parasitics) and variations in components. WPT system 100 can be implemented with a monolithic TX chip and a monolithic RX chip for a higher-level of integration for biomedical implants. In addition, wireless hysteretic control, similar to WPT system 100, can be implemented with discrete components such as, but not limited to, a dedicated microcontroller, a field-programmable gate array (FPGA), power transistors, and drivers for other applications, such as consumer electronics. The wireless hysteretic control can also be applied to isolated DC-DC converters, or any power converter that has a primary and secondary side with inductive coupling.

In an example embodiment, WPT system 100 can be implemented with a biomedical implant in which a RX chip 105 is disposed under skin 170 and a TX chip 130 is disposed outside skin 170. TX chip 130 is connected to a coil 102 in series with a TX capacitor 101, having capacitance $C_{TX}$, connected to an output node 132 of TX chip 130 providing a voltage $V_X$. Another output node 133 of TX chip 130 can be connected to the power ground. RX chip 105 is connected to an RX coil 104 connected in parallel to an RX capacitor 103, having capacitance $C_{RX}$, connected between inputs 106 and 107 of RX chip 105 with these inputs to be operationally at $V_{AC1}$ and $V_{AC2}$, respectively. Coil 102 and TX capacitor 101 are not limited to a series arrangement but can be connected together in another configuration such as a parallel arrangement. Coil 104 and RX capacitor 103 are not limited to a parallel arrangement but can be connected together in another configuration such as a series arrangement. Coil 102 and coil 104 are separated by skin 170, with coil 102 and coil 104 having a mutual inductance of $K_{TX\_RX}$, providing a wireless power and LSK regulation link 180 between TX chip 130 and RX chip 105. The arrangement of components of WPT system 100 are not limited to an implant application but can be used in other arrangements to transfer power wirelessly with TX wireless power regulation and RX local linear voltage regulation in which skin 170 can be replaced by an insulating dielectric associated with the application for which operational properties of WPT system 100 can be implemented.

TX chip 130 can include an input to receive a supply voltage that can be, but is not limited to, $V_1$=1.8 V. The source of the supply voltage can be a battery. Other sources for the supply voltage can be used. TX chip 130 has a class D amplifier having a driver 136 to a p-channel metal-oxide-semiconductor (PMOS) transistor 138 connected to output node 132 operatively providing $V_X$ and a driver 137 to a n-channel metal-oxide-semiconductor (NMOS) transistor 139 connected to output node 133, which is operatively referred to such as ground. TX chip 130 may also apply to Tx topologies with other amplifiers, such as Class E, as the power stage. PMOS transistor 138 and NMOS transistor 133 can be silicon power transistors or power transistors made by other materials, such as wide-bandgap materials. Drivers 136 and 137 have inputs from a TX pulse-skipping power modulator 155 that operates based on input from dual-boundary comparators and logics 147 and a voltage-controlled oscillator (VCO) 151. Other types of power modulators can be used in TX 130. An integrated current sensor 140, which senses wireless power regulation from RX chip 105 via current in PMOS transistor 138, provides operational control to dual-boundary comparators and logics 147. A current source 150 provides a bias source for dual-boundary comparators and logics 147, VCO 151, and integrated current sensor 140.

RX chip 105 can include a transistor 112 connected between inputs 106 and 107 in parallel with a capacitor 111, having capacitance $C_{AC}$. The transistor 112 effectively controls the wireless power regulation to TX 130, sensed by the integrated current sensor 140 of TX 130, via the mutual inductance of coil 104 and coil 102 in response to an impedance change provided by action of transistor 112. The source and drain of transistor 112 are also connected to a rectifier 115. The rectifier can be implemented as an active or passive rectifier. Rectifier 115 is connected to a linear current sink 120 that provides a regulated voltage $V_O$ that is an output voltage of RX 105 at output node 108 to implant circuits 175 under skin 170. The linear current sink is used for voltage regulation and can be replaced by other types of voltage regulation circuits such as a shunt regulator or linear regulator. Implant circuits 175 are also connected as the loading circuits to a node 109 of RX 105, which can be referred to as a ground. Implant circuits 175 are in parallel with an input load capacitor 172, having a capacitance $C_{O2}$, connected to output nodes 108 and 109 and in parallel with an optional output capacitor 113, having capacitance $C_{O1}$, connected to output nodes 108 and 109. Output capacitor 113 is disposed within RX 105, while load capacitor 172 is disposed exterior to RX 105. To provide the wireless signal from RX 105 back to TX 130, transistor 112 is connected at its gate to a driver 129 that is controlled by a LSK signal generation 110, where LSK signal generation circuits 110 is connected to linear current sink 120 and powered by $V_O$.

The arrangement of WPT system 100 provides for TX wireless power regulation and RX local voltage regulation with wireless hysteretic control. Implementation of a fully integrated current sensor on TX chip can eliminate the use of sensing coil, separate from coil 102, at the TX side of WPT system 100. Alternatively, a sensing coil can be used to substitute for the integrated current sensor. In WPT system 100, a control methodology is implemented to control the output voltage of RX 105 with respect to a high boundary and a low boundary. When the output voltage hits the high boundary, RX 105 enters an over-power status and changes the impedance of RX 105 seen by TX 130. TX 130 adjusts its transmitted power based on the changed impedance and RX 105 receives less power. With RX 105 receiving less power, the output voltage of RX 105 decreases. When the output voltage hits the low boundary, RX 105 enters an under-power status and again changes the impedance of RX 105 seen by TX 130. TX 130 adjusts its transmitted power again and RX 105 receives more power. With RX 105 receiving more power, the output voltage of RX 105 increases until it again hits the high boundary. The process continues regulating the output voltage with respect to the high and low boundaries. Two signals generated in the processes of changing impedance are referred to as LSK signals. It is noted that even if TX 130 does not respond to the LSK signal to reduce transmitted power, the output voltage at RX 105 can still be maintained around the high boundary because of the linear current sink of RX 105.

Figure 2:
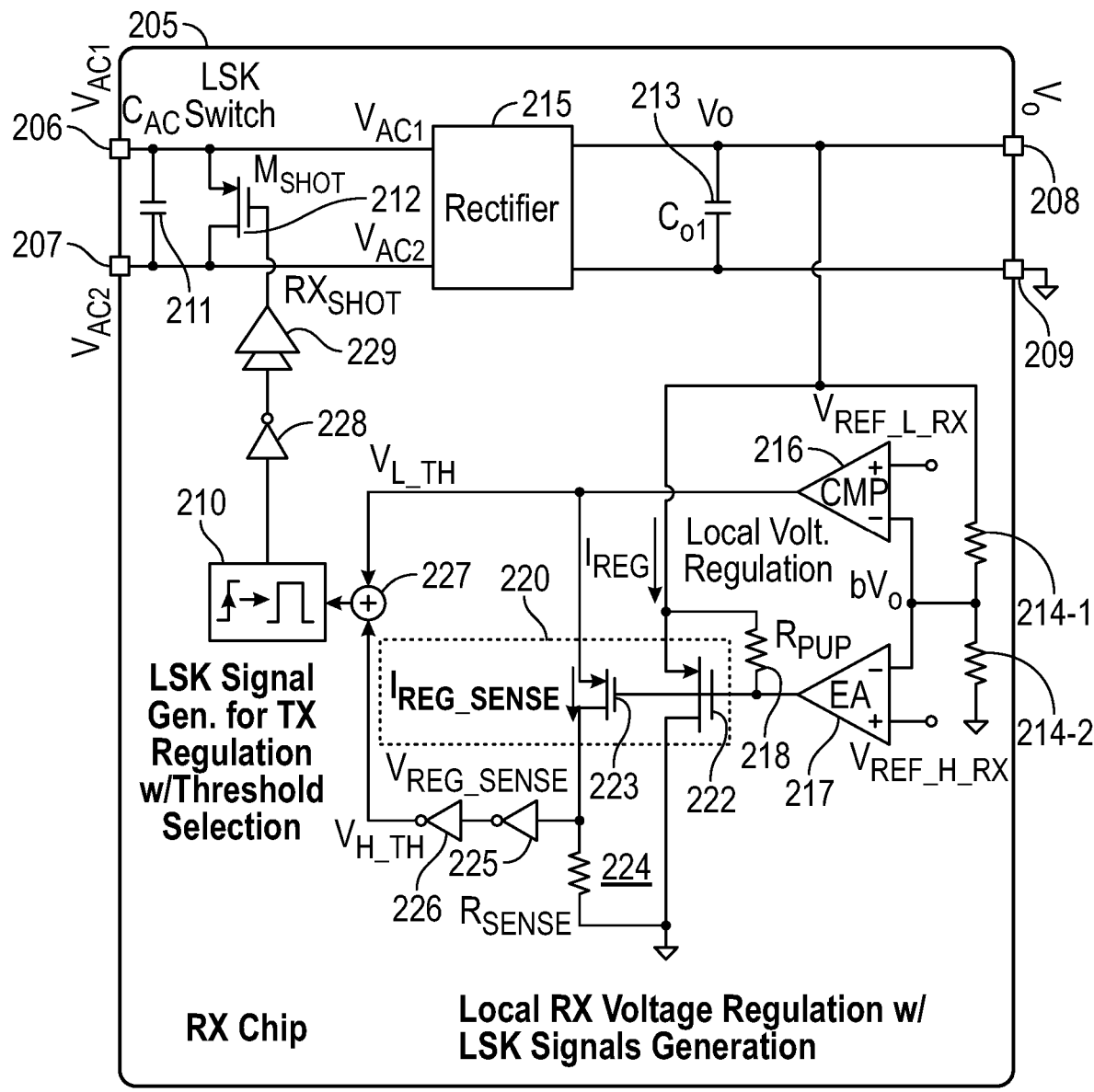
FIG. 2 illustrates an example circuitry implementation of a receiver as a receiver chip having local receiver voltage regulation with load-shift-keying signal generation, in accordance with various embodiments.

FIG. 2 illustrates an embodiment of an example circuitry implementation of an RX 205 as a RX chip having local receiver voltage regulation with LSK signal generation. RX 205 of FIG. 2 can be implemented in an arrangement similar or identical to WPT system 100 of FIG. 1. RX 205 has inputs 206 and 207 to connect to a Rx coil to receive voltages $V_{ac1}$ and $V_{ac2}$, respectively, in response to a Tx driving a Tx coil that has a mutual induction with the Rx coil. RX 205 can include an output node 208 to output a voltage $V_O$ with respect to reference node 209, where reference node 209 can be connected to a reference such as a ground. RX 205 can have a capacitor 211, having a capacitance $C_{ac}$, and PMOS transistor 212 ($M_{SHOT}$) connected in parallel to the inputs 206 and 207 to receive $V_{ac1}$ and $V_{ac2}$ and connected to a rectifier 215 having input connections to receive $V_{ac1}$ and $V_{ac2}$. Rectifier 215 can be implemented as an active rectifier with switch timing optimization. A RX output capacitor 213, having capacitance $C_{O1}$, is connected to output connections of rectifier 215 and connected between output node 208 and output node 209 of TX 205. Though not shown, RX 205 includes one or more biasing sources.

A local linear current-sink voltage regulator for $V_O$ can be implemented using a representation of $V_O$ and comparison circuits 216 and 217. Comparison circuit 216 can have an input to receive reference voltage $V_{REF\_L\_RX}$, and comparison circuit 217 can have an input to receive reference voltage $V_{REF\_H\_RX}$. Though comparison circuit 216 is implemented as a comparator and comparison circuit 217 is implemented as an error amplifier (EA) in the example of FIG. 2, other arrangements of comparison circuits can be used. The representation of $V_O$ can be provided by a voltage divider using a resistor 214-1 and a resistor 214-2 to provide a divided output (b$V_O$). Other arrangements can also be implemented to provide the representation of $V_O$ with b less than one, equal to one, or greater than one. Reference voltage $V_{REF\_L\_RX}$ and reference voltage $V_{REF\_H\_RX}$ can be provided within RX 205 or provided externally by other circuits. Alternatively, the magnitudes of reference voltage $V_{REF\_L\_RX}$ and reference voltage $V_{REF\_H\_RX}$ can be programmable in control circuitry for parameters of RX 205. Such control circuitry can be implemented in the integrated circuit (chip) containing RX 205 or exterior to RX 205 by other circuits.

For local voltage regulation, a regulation current $I_{REG}$ is provide to PMOS transistor 222 and resistor 218 having a resistance of $R_{PUP}$, where PMOS transistor 222 and resistor 218 receive an output from comparison circuit 217. A PMOS transistor 223, which is connected to comparison circuit 216, provides a current $I_{REG\_SENSE}$ that senses $I_{REG}$. PMOS transistor 223 is a smaller transistor than PMOS transistor 222 providing a ratio to mirror the current from the PMOS transistor 222 to PMOS transistor 223. A sense resistor 224, having a resistance of $R_{SENSE}$, an inverter 225, and an inverter 225 are used to convert $I_{REG\_SENSE}$ to a corresponding voltage $V_{REG\_SENSE}$ to provide a high threshold voltage $V_{H-TH}$ to a summer 227. Summer 227 is also connected to the output of comparator 216 to receive a low threshold voltage $V_{L-TH}$.

Figure 3:
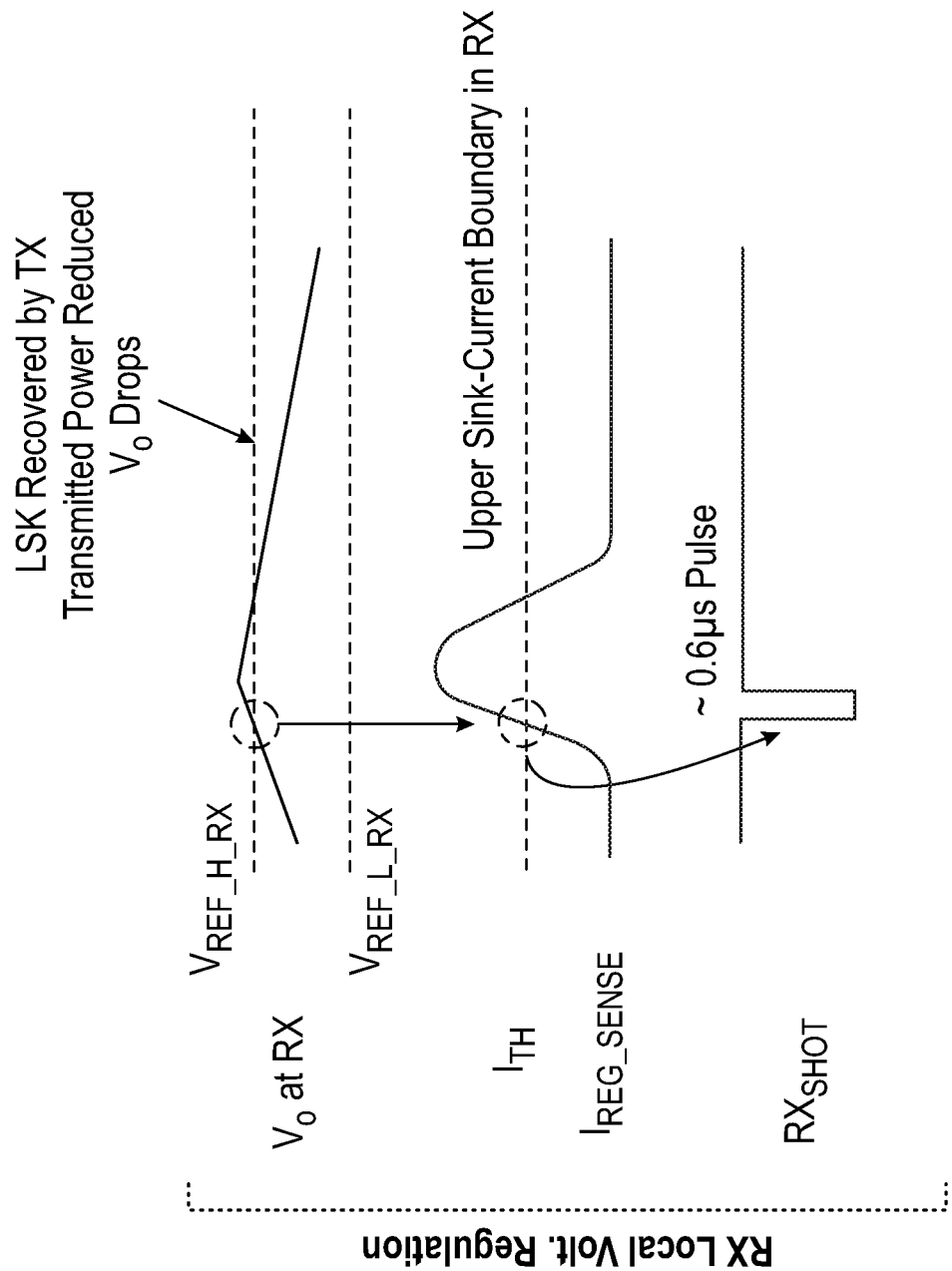
FIG. 3 illustrates an operational principle of the receiver of FIG. 2, in accordance with various embodiments.
Figure 4:
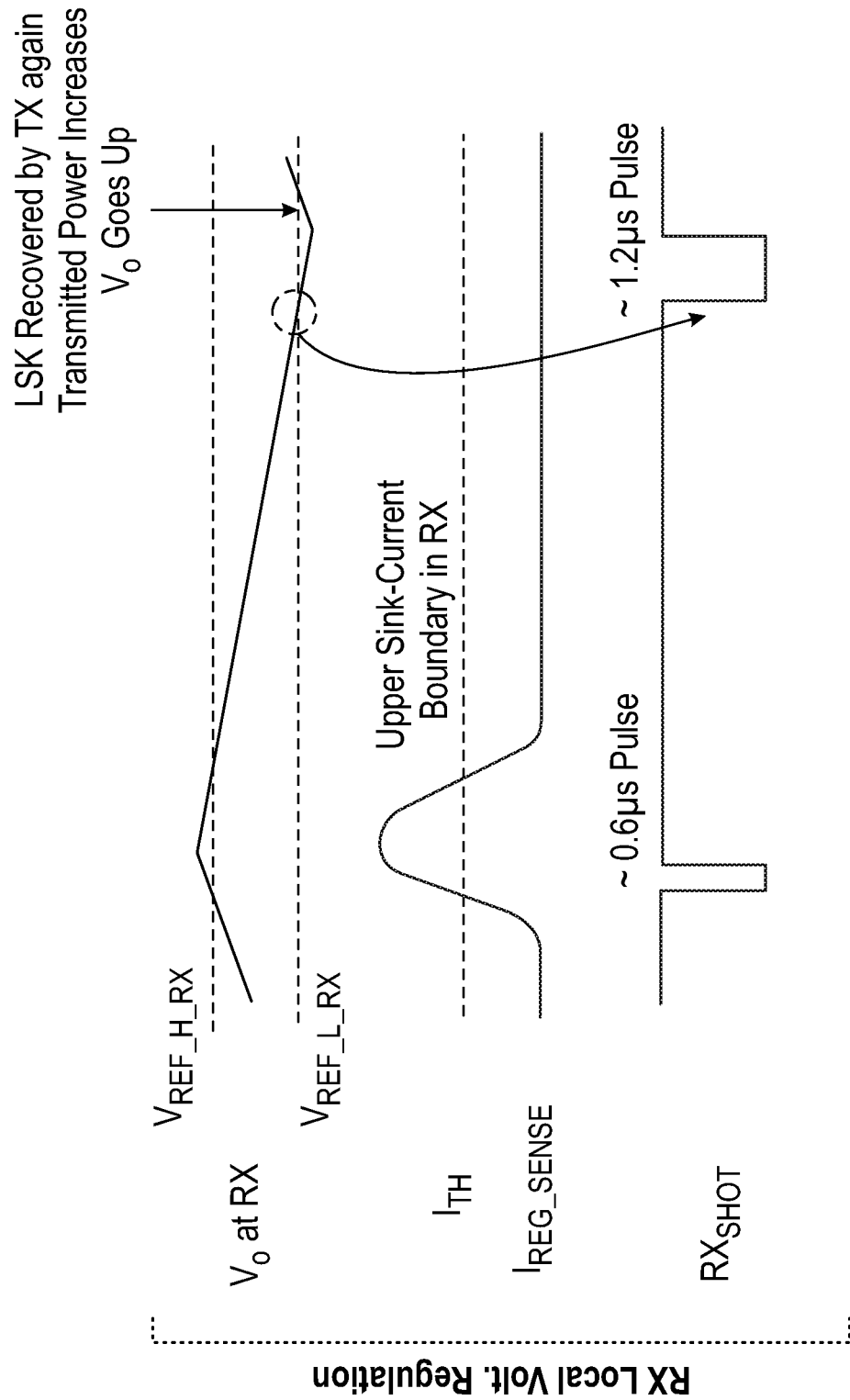
FIG. 4 illustrates another operational principle of the receiver of FIG. 2, in accordance with various embodiments.

Summer 227 is connected to an LSK signal generator 210 for TX regulation with threshold selection. LSK signal generator 210 can be implemented as a rising edge detector and pulse generator for LSK signal generation. When LSK signal generator 210 detects a rising edge of a signal, it generates a pulse. Depending on whether the output of the summer 227 hits high threshold voltage $V_{H-TH}$ or low threshold voltage $V_{L-TH}$, LSK signal generator 210 can generate two different lengths of pulses, as shown in FIGS. 3 and 4. LSK signal generator 210 is connected to an inverter 228 that provides input to a driver 229. Driver 229 is connected to a gate of PMOS transistor 212 ($M_{SHOT}$). A driver can be selected to provide strong drivability to a relatively large transistor to switch the transistor with acceptable switching speed. Typically, logics, such as inverters, are too small or weak to drive a large power transistor. With respect to the transistors of RX 205, PMOS $M_{SHOT}$ 212 can be a relatively large transistor to provide a lower impedance to enhance the LSK signal received by the Tx.

FIGS. 3 and 4 illustrate an embodiment of operation principles of RX 205 of FIG. 2. Rx voltage can be regulated by the linear current sink of RX 205 with current $I_{REG}$. PMOS transistors 222 and 223 have gates with a common input. PMOS transistor 223 senses $I_{REG\_SENSE}$ with $I_{REG}$ provided to PMOS transistor 222. After $I_{REG\_SENSE}$ reaches a threshold of an upper sink-current boundary in RX 205 corresponding to $V_O$ reaching reference voltage $V_{REF\_H\_RX}$ from receiving power, an approximate 600 ns pulse drives $M_{SHOT}$ transistor 212 to create a LSK signal. After the TX recovers LSK signal and reduces the transmitted power, $V_O$ of RX 205 starts to drop, as shown in FIG. 3. Once $V_O$ drops below $V_{REF\_L\_RX}$, an approximate 1.2 µs pulse is generated to drive $M_{SHOT}$ transistor 212 to create another LSK signal, and the TX will provide maximum power to charge up $V_O$ of RX 205, as shown in FIG. 4. The 600-ns and 1.2-µs can be adjusted longer or shorter depends on the coupling coefficient and other parameters in different applications.

The local voltage regulation in RX chip 205 of FIG. 2 can be achieved by a linear current-sink voltage regulator using a regulating current $I_{REG}$. EA 217 can be used to compare the divided output (b$V_O$) to $V_{REF\_H\_RX}$, which defines an upper boundary of a hysteretic window. If b$V_O$ is higher than $V_{REF\_H\_RX}$, the sink current $I_{REG}$ increases to reduce $V_O$ for voltage regulation. The smaller transistor, PMOS transistor 223, is used to sense $I_{REG}$ as $I_{REG\_SENSE}$. Once $I_{REG\_SENSE}$ reaches a loosely controlled boundary based on the threshold of an inverter, indicating too much power is received by RX 205, an approximate 600 ns pulse can be generated, as shown in FIG. 3, to turn on $M_{SHOT}$ and reject power from the driving TX. This will introduce a rapid impedance change at the input of RX 205 and will be reflexed to the TX as larger current pulses flooding into the TX coil as an LSK signal.

Figure 5:
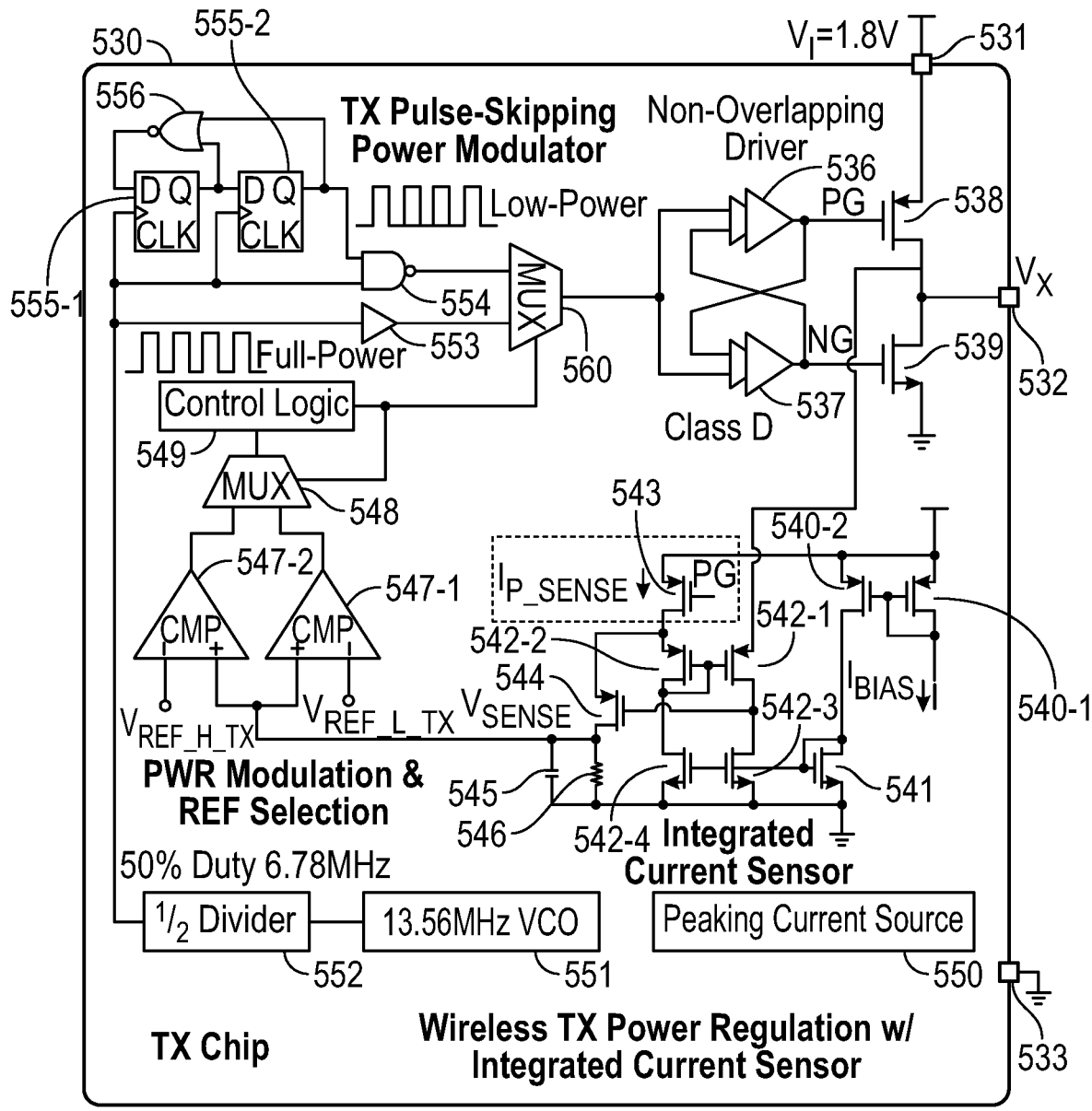
FIG. 5 illustrates an example circuit implementation of a transmitter as a transmitter chip having wireless transmitter power regulation with an integrated current sensor, in accordance with various embodiments.

FIG. 5 illustrates an embodiment of an example circuitry implementation of a TX 530 as a TX chip having wireless transmitter power regulation with integrated current sensor. Tx 530 has an input 531 to receive a supply voltage. The supply voltage can be, but is not limited to, $V_1$=1.8 V. The source of the supply voltage can be a battery. Other sources for the supply voltage can be used. Tx 530 has nodes 532 and 533 to couple to a Tx coil to provide a voltage $V_X$ to drive a Tx coil that has a mutual induction with a Rx coil. With TX 350 implemented in conjunction with RX 205 of FIG. 2 in an arrangement similar or identical to WPT system 100 of FIG. 1, the mutual induction is $k_{TX\_RX}$. TX 530 can include node 532 configured to provide a voltage $V_X$ with respect to reference node 533, where reference node 533 can be connected to a reference such as a ground. Node 532 can be connected to a class D non-overlapping driver.

An embodiment of the class D non-overlapping driver, connected to node 532, can include a power PMOS transistor 538, a power NMOS transistor 539, a driver 536, and a driver 537. PMOS transistor 538 can be connected to input node 531 and to NMOS transistor 539 that is connected to ground. Node 532 is connected to a drain of PMOS transistor 539 that is connected to a drain of NMOS transistor 539. An output node of driver 536 can be connected to a gate of PMOS transistor 538 at node PG. An output of driver 537 can be connected to a gate of PMOS transistor 538 at node NG. Node PG is also connected to one input of driver 537. Another input of driver 537 is connected to an output of a multiplexer (MUX) 560. Node NG is also connected to one input of driver 536. Another input of driver 536 is connected to the output of MUX 560 to which the input of driver 537 is connected.

Current in power PMOS transistor 538 of the class D class driver can be mirrored, as $I_{P\_SENSE}$, in a PMOS transistor 543. PMOS transistor 543 has a gate connected to node PG of the class-D driver and a source connected to a sourcing arrangement provided by a PMOS transistor 540-1 and a PMOS transistor 540-2 connected to source to provide biasing current $I_{BIAS}$. The sensed current $I_{P\_SENSE}$ flows in operation of the integrated current sensor of TX 530. $I_{P\_SENSE}$ is current mirrored from the class D class driver from current to PMOS transistor 542-1 used in conjunction with PMOS transistor 542-2 and NMOS transistors 542-3, 542-4, and 541. A sensed voltage $V_{SENSE}$ is generated, in operation, by the flow of $I_{P\_SENSE}$ to a parallel combination of a resistor 546 and capacitor 545, which combination is connected to a PMOS transistor 544.

In operation, $V_{SENSE}$ is provided to a power modulation and a reference selection section of TX 530. $V_{SENSE}$ can be provided connected to the positive input terminal of a comparator 547-1 and the positive input terminal of a comparator 547-2. A reference voltage $V_{REF\_L\_TX}$ is provided to the negative input terminal of comparator 547-1 and a reference voltage $V_{REF\_H\_TX}$ is provided to the negative input terminal of comparator 547-2. Reference voltage $V_{REF\_L\_TX}$ and reference voltage $V_{REF\_H\_TX}$ can be provided and programmable within TX 530 or externally by other circuits. An output of comparator 547-1 is connected to an input of MUX 548 and an output of comparator 547-2 is connected to another input of MUX 548. An output of MUX 548 is connected to a control logic 549, where control logic 549 along with MUX 548 is connected, to provide control signals, to MUX 560 whose output is connected to the input to the class D non-overlapping driver at the inputs to driver 536 and driver 537.

MUX 560 also has inputs from a power modulator such as a TX pulse-skipping power modulator. A voltage control oscillator (VCO) 551 is used to provide a clock signal to the TX pulse-skipping power modulator. VCO 551 can be a 13.56 MHz VCO. VCO 551 can be connected to a one-half divider 552 to provide a 50% duty cycle signal at 6.78 MHz for a 13.56 MHz VCO. The one-half divider 552 is connected to a clock (CLK) input of a flip-flop 555-1, to a CLK input of a flip-flop 555-2, to an input of a NAND gate 554, and to an input of an amplifier 553. Flip-flop 555-1 and flip-flop 555-2 can be D-flip-flops. An output of flip-flop 555-1 is connected to a non-clock input of flip-flop 555-2 and to an input of a NOR gate 556. An output of flip-flop 555-2 is connected to another input of NOR gate 556. An output of NOR gate 556 is connected to a non-clock input of flip-flop 555-1. The output of flip-flop 555-2 is also connected an input of NAND gate 554 that is different from the input of NAND gate 554 to which the one-half divider 552 is connected. An output of NAND gate 554 is connected to an input of MUX 560 with an output of amplifier 553 connected to another input of MUX 560. A peaking current source 550 can be implemented in TX 530 to provide bias current to various components of TX 530.

Figure 6:
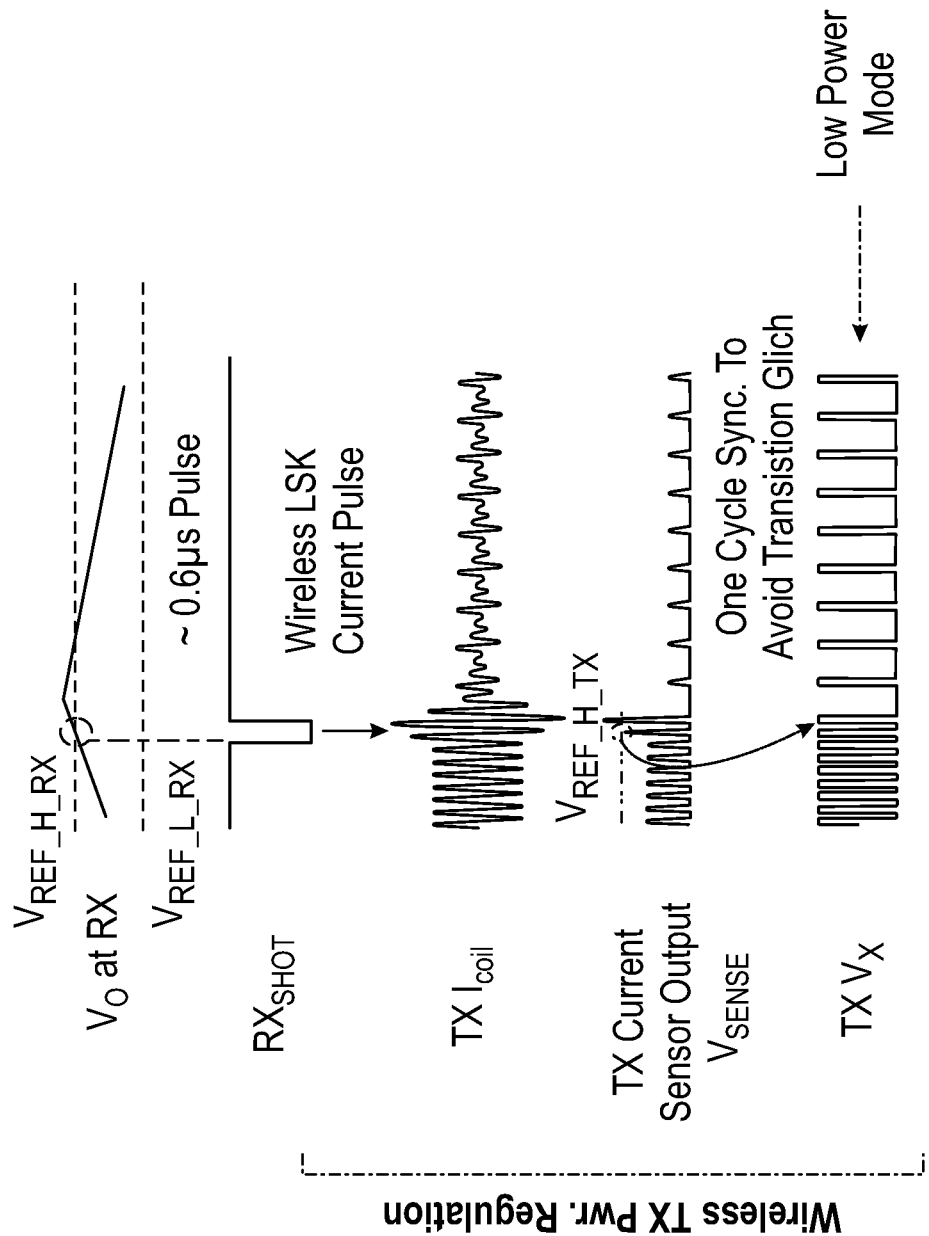
FIG. 6 illustrates an operational principle of the transmitter of FIG. 5, in accordance with various embodiments.
Figure 7:
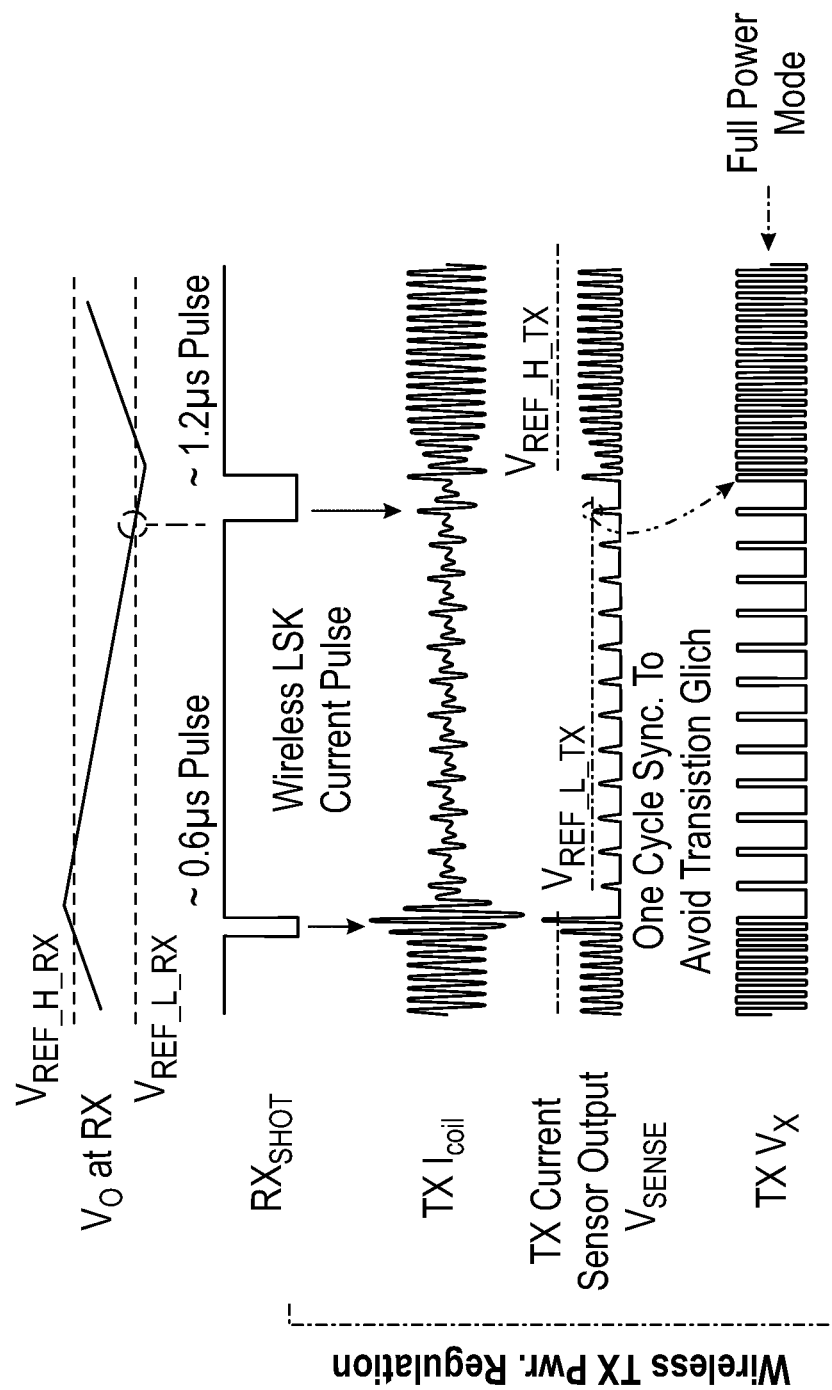
FIG. 7 illustrates another operational principle of the transmitter of FIG. 5, in accordance with various embodiments.

In TX 530, an integrated current sensor senses the current through power PMOS 538 in the Class-D driver as $V_{SENSE}$. An LSK signal can arrive at the TX side as a current pulse and can be sensed by integrated current sensor. After $V_{SENSE}$ rises above $V_{REF\_H\_TX}$, the TX will operate in low-power mode, as shown in FIG. 6. In this mode, the Class-D driver will be driven by a pulse-skipping clock, in which the power PMOS 538 only turns on once every three consecutive cycles, reducing the charging time of the coil, to which TX 530 is connected, to ⅓. With RX 205 of FIG. 2 arranged with TX 530 in a manner similar or identical to WPT system 100, the power received by RX 205 will be reduced, and $V_O$ of RX 205 will start to decline as shown in FIG. 6. As $V_O$ in RX 205 continues dropping below the lower boundary $V_{REF\_L\_RX}$, a longer approximate 1.2 μs pulse will be applied to $M_{SHOT}$ again as shown in FIG. 4 and FIG. 7, indicating insufficient power. The different widths of LSK pulses in triggering the upper and lower boundaries are designed to ensure enough LSK signal intensity in different modes and coupling conditions. Once $V_{SENSE}$ in TX 530 reaches $V_{REF\_L\_TX}$, which is lower than $V_{REF\_H\_TX}$ to adjust to the lower LSK signal intensity in low-power mode, TX 530 will switch back to full-power mode, as shown in FIG. 7, to charge up the RX output node 208 of RX 205 of FIG. 2, for example. A one cycle can be used for synching to avoid a transition glitch. Different threshold levels and LSK pulse widths can be designed to adopt LSK signal intensity in different modes.

Figure 8:
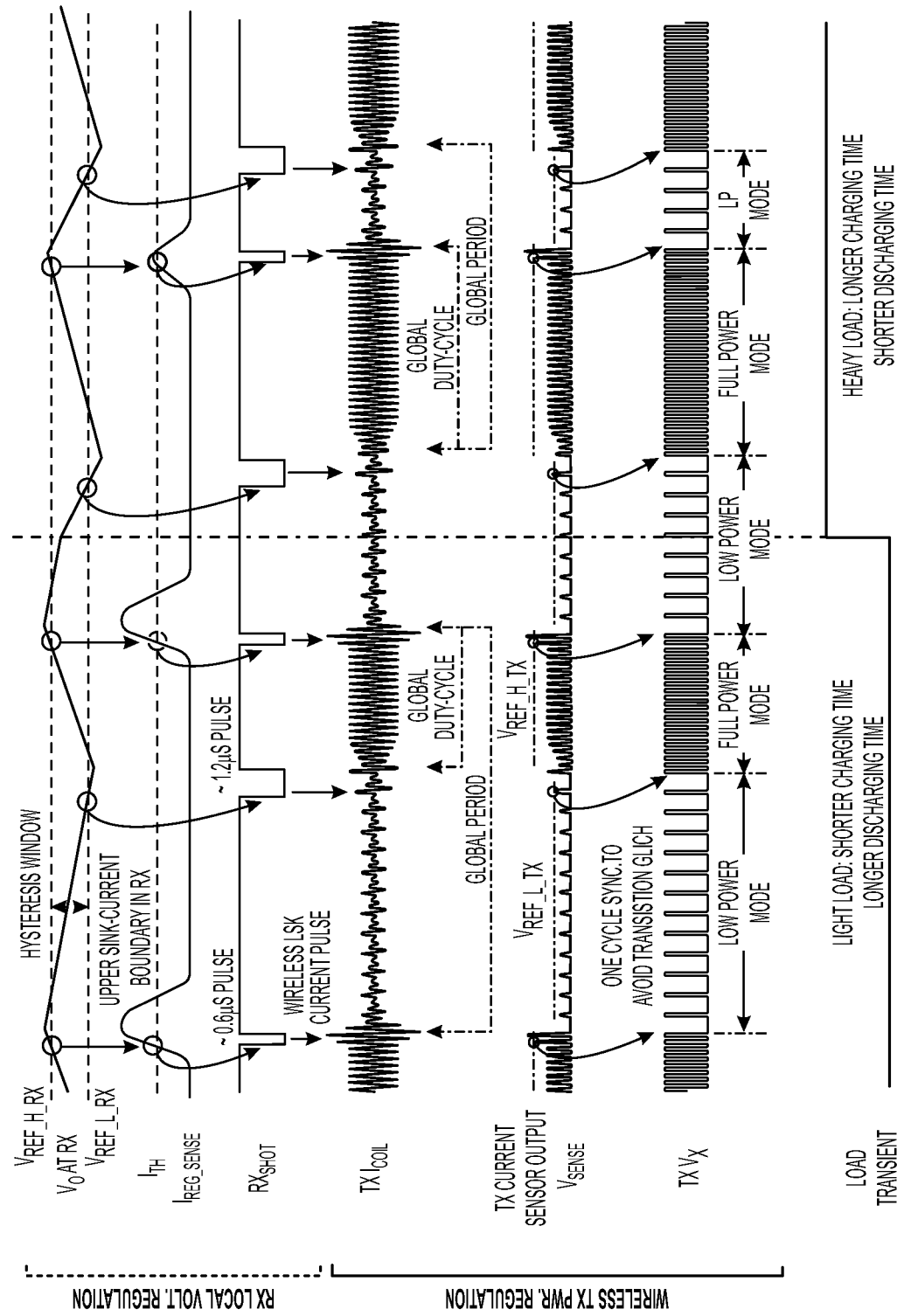
FIG. 8 illustrates an overview of an operation principle for wireless transmitter power regulation and receiver local voltage regulation provided by the receiver of FIG. 2 and the transmitter of FIG. 5 operating together as in the wireless power transfer system of FIG. 1, in accordance with various embodiments.

In the operation discussed above, the wireless hysteretic operation between TX 530 and RX 205 can be established with $V_O$ controlled within a 75-mV hysteretic window, in this example embodiment. Since $V_O$ is limited essentially within the hysteretic window, any change in loading only results in changes in a global duty-cycle (D), which is the ratio of the period of full-power mode to the total period of both full-power plus low-power modes, as illustrated in FIG. 8. If a light-to-heavy load transient happens, this design will just enter the low-power mode less frequently, resulting in longer time in full-power mode, thus larger global D.

FIG. 8 illustrates an overview of an operation principle for wireless TX power regulation and RX local voltage regulation provided by structures RX 205 of FIG. 2 and TX 530 of FIG. 5 operating together as in WPT system 100 of FIG. 1, as discussed above. As shown in FIG. 8, for RX 205 operating in a hysteresis window with the output $V_O$ of RX 205 increasing for an output $V_X$ of TX 530 providing current TX $I_{COIL}$ to coil 102 with output $V_{SENSE}$ from integrated current sensor of TX 530, a control pulse of approximately 600 ns is generated in RX 205 when $V_O$ exceeds $V_{REF\_H-RX}$, indicating an over-powered status. In response to this status in the RX, $V_{SENSE}$ in TX 530 is picked up and sets TX 530 in low-power mode, with one pulse every three consecutive cycles. This interval in low-power mode is an example implementation, which can be adjusted based on an application scenario to which RX 205 is used. Due to the reduced power in TX 530, $V_O$ decreases until $V_O$ reduces below $V_{REF\_L-RX}$ at which time a control pulse of approximately 1.2 μs is generated in RX 205, indicating an over-powered status. In response to this status in RX 205, $V_{SENSE}$ in TX 530 is picked up and sets TX 530 in full-power mode, with VX switching in every cycle. Due to the full power provided by TX 530, $V_O$ increases until $V_O$ exceeds $V_{REF\_H-RX}$ at which time the process continues as before. The number of power modes (e.g., low-power mode and full-power mode), can be further extended to multiple power modes with higher regulation resolution. In case of a load transient, there will be no voltage drops or overshoots that will occur at $V_O$, which were commonly observed in previous linearly controlled WPT systems due to the bandwidth limitations.

Two boundaries, $V_{REF\_H\_RX}$ and $V_{REF\_L\_RX}$ are set as the hysteretic window for the RX output voltage $V_O$. When $V_O$ reaches the upper boundary $V_{REF\_H\_RX}$, RX will initialize an approximately 0.6-μs pulse to turn on $M_{SHOT}$ indicating that RX is receiving too much power. This creates a rapid impedance change at the RX inputs, which will then be reflected to the TX via LSK backscattering as a surge current in the TX power coil. At TX, this surge current will be sensed by an integrated current sensor and further converted to a voltage signal $V_{SENSE}$. Once $V_{SENSE}$ is larger than a reference $V_{REF\_H\_RX}$, TX will switch to low-power mode with pulse skipping logics to reduce the transmitted power. With less power being transmitted to the RX, $V_O$ will start to decrease. When $V_O$ eventually hits the lower boundary $V_{REF\_L\_RX}$, RX again will generate a longer approximately 1.2-µs LSK pulse as an indicator of insufficient power. Similarly, this LSK pulse will be reflected to the TX and then picked up by the TX current sensor. When $V_{SENSE}$ is higher than $V_{REF\_L\_RX}$, TX will switch back to the full-power mode to provide maximum power to charge up $V_O$ again. Since the transmitted power is lower when TX is driving the coil with pulse-skipping patterns, a longer LSK pulse width is used to compensate the intensity variation.

By using this control scheme, $V_O$ will be regulated within the hysteretic window, with TX switching between the full-power mode and low-power mode to adjust the transmitted power dynamically. When a light-to-heavy load transient happens, as illustrated in FIG. 8, $V_O$ will be discharged faster or be charged slower. As long as $V_O$ hits the hysteretic window, TX will switch to the full-power or low-power mode to charge or discharge the output immediately. Therefore, because of the nature of the hysteretic operation, $V_O$ will substantially be bounded within the hysteretic window. As a result, theoretically there will be no under-/over-shoots during load transients, but only regular mode-transitions that always happen in steady-states.

Figure 9:
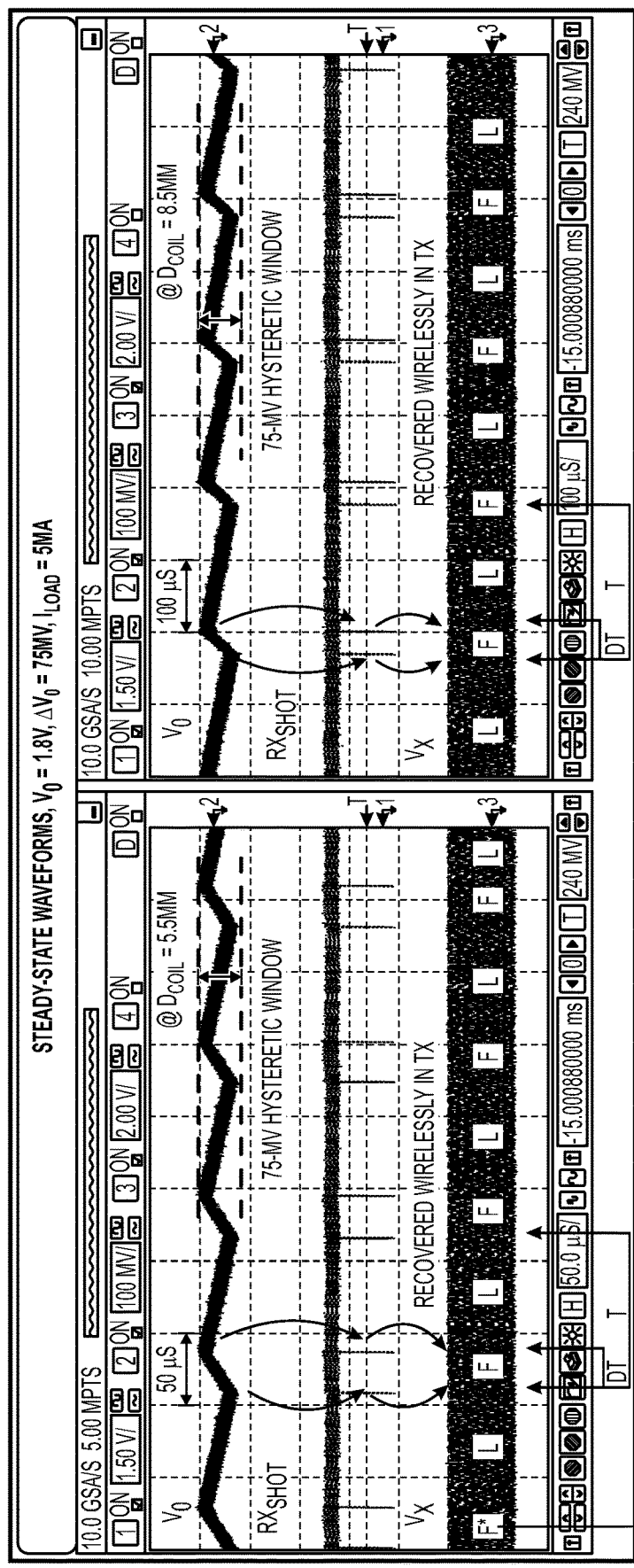
FIG. 9 shows measured steady-state waveforms for operation of a receiver and a transmitter for a wireless power transfer system as structured in FIGS. 1, 2, and 5, in accordance with various embodiments.
Figure 10:
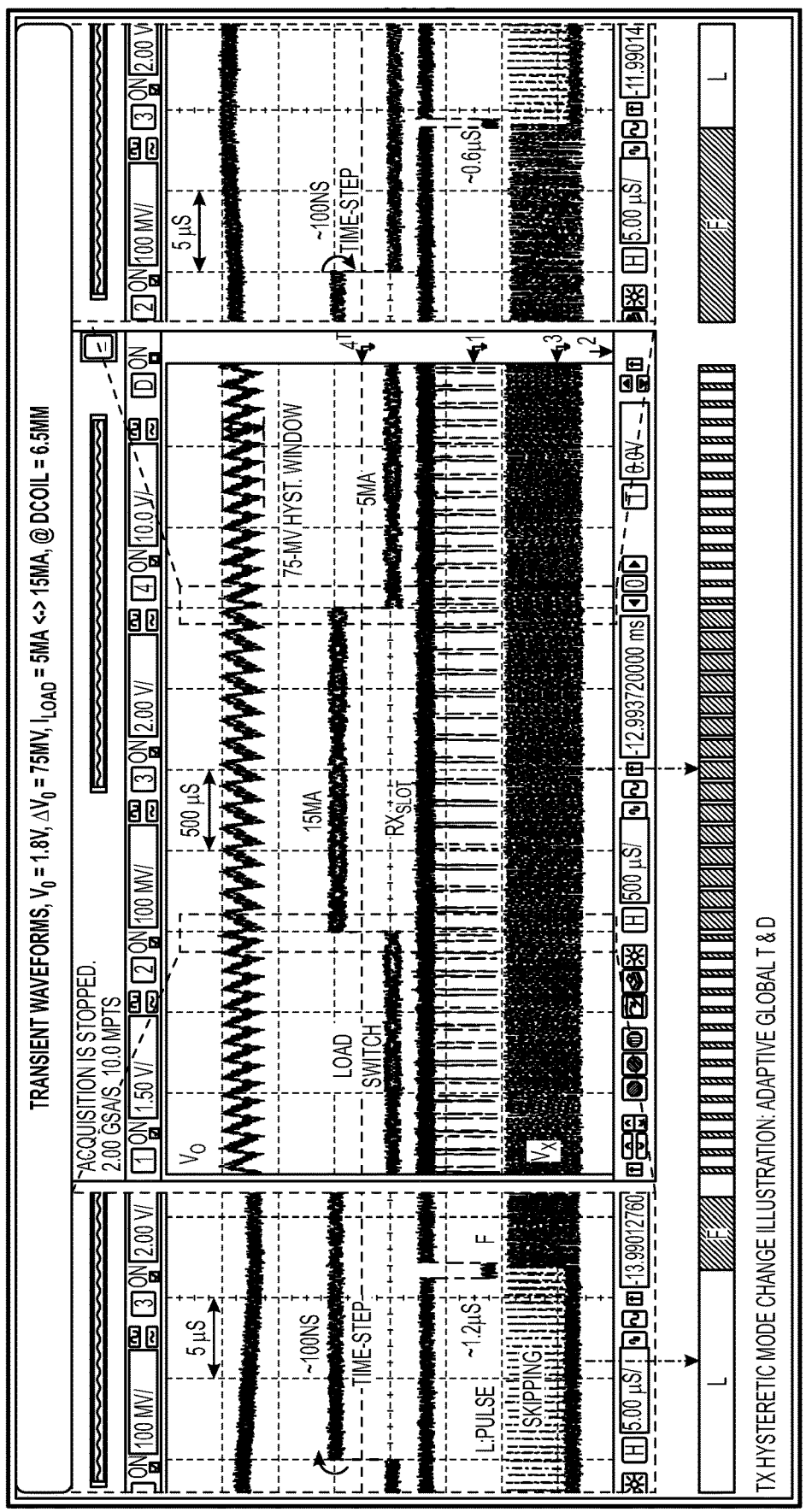
FIG. 10 shows load-transient waveforms associated with FIG. 9, in accordance with various embodiments.

FIG. 9 shows measured steady-state waveforms for operation of a RX and a TX for a system as structured in FIGS. 1, 2, and 5, for example. The parameters for the steady-state waveforms in this example include $V_O$=1.8V and $\Delta V_O$=75 mV with $I_{LOAD}$=5 mA. The TX reacts promptly once $V_O$ hits the 75-mV hysteretic window, providing full power when $V_O$ reaches the valley and saving power when $V_O$ reaches the peak. FIG. 10 shows the load-transient waveforms between 5 mA and 15 mA associated with FIG. 9, with a coil having a diameter of 6.5 mm. Because of the nature of the wireless hysteretic control, no voltage drops or voltage overshoots are observed, and the transitions in load transients are seamless and instant. In addition, at lighter loading conditions and therefore with gentler discharging slope, the system stays in low-power mode for a longer period. This adaptive period, in contrast to the constant idle time in previous designs, minimizes the interruption due to TX regulation and thus reduces the root-mean-square currents through both LC tanks and power losses in a control transistor, such as $M_{SHOT}$ 212 of RX 205 of FIG. 2, during reenergizing the wireless link and generating the LSK signals, respectively. As a result of the power-loss reduction, the techniques taught herein achieves an up-to-20% light-load efficiency boosting compared to a previous design. When compared to using RX local voltage regulation only, an end-to-end efficiency enhancement, up to 37%, is observed by enabling the wireless hysteretic control.

Figure 11:
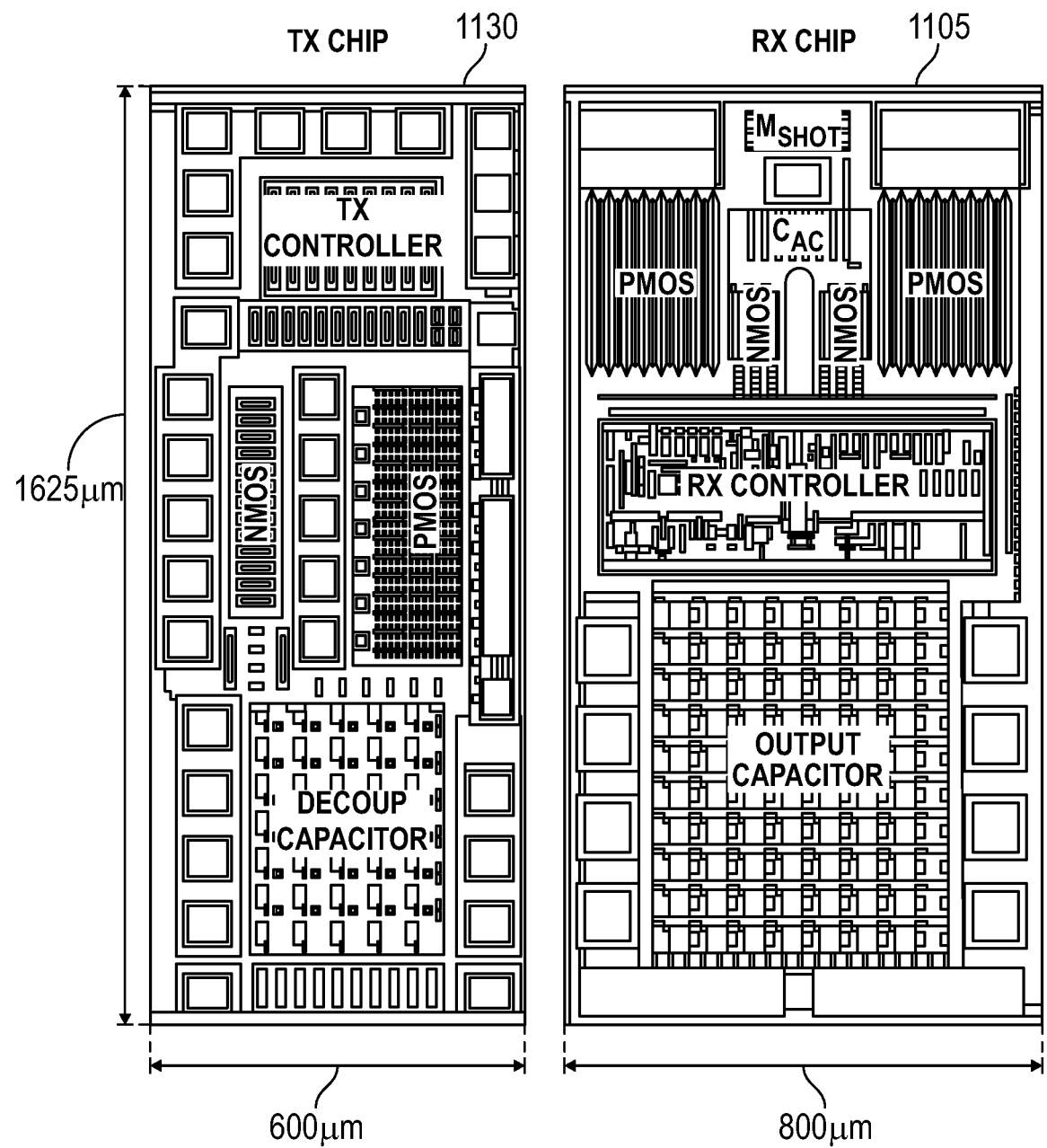
FIG. 11 shows a photo of transmitter and receiver chips that can be implemented similar to the transmitter of FIG. 5 and the receiver of FIG. 2, in accordance with various embodiments.
Figure 12:
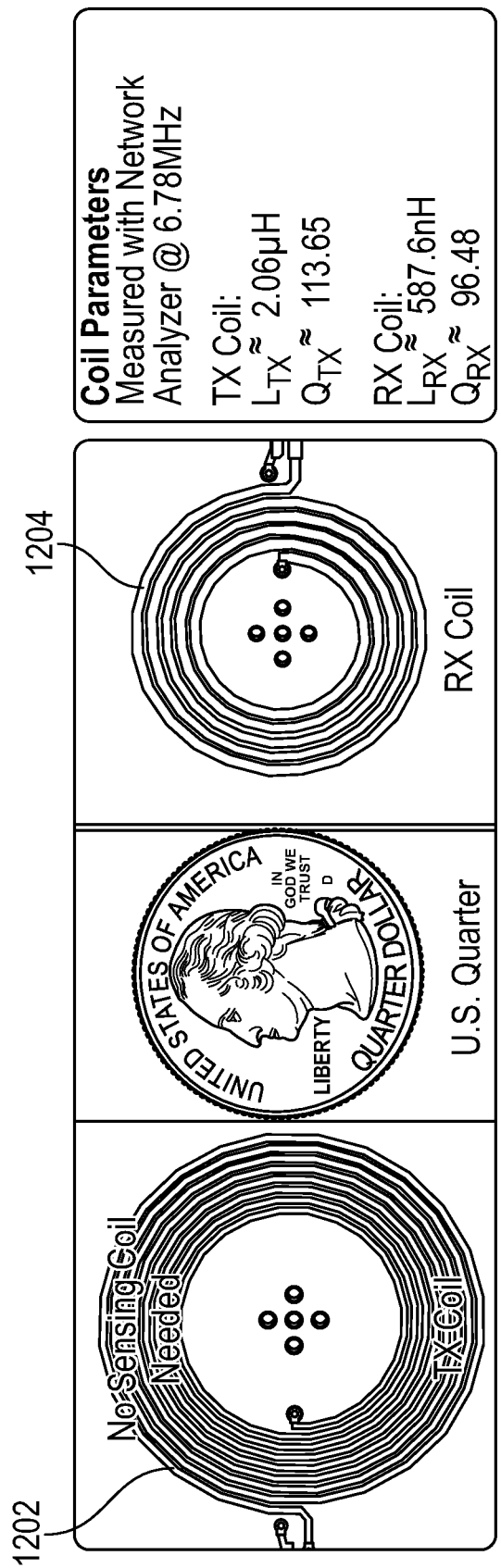
FIG. 12 illustrates sizes of coils that can be used with the transmitter of FIG. 5 and the receiver of FIG. 2, in accordance with various embodiments.
Figure 13:
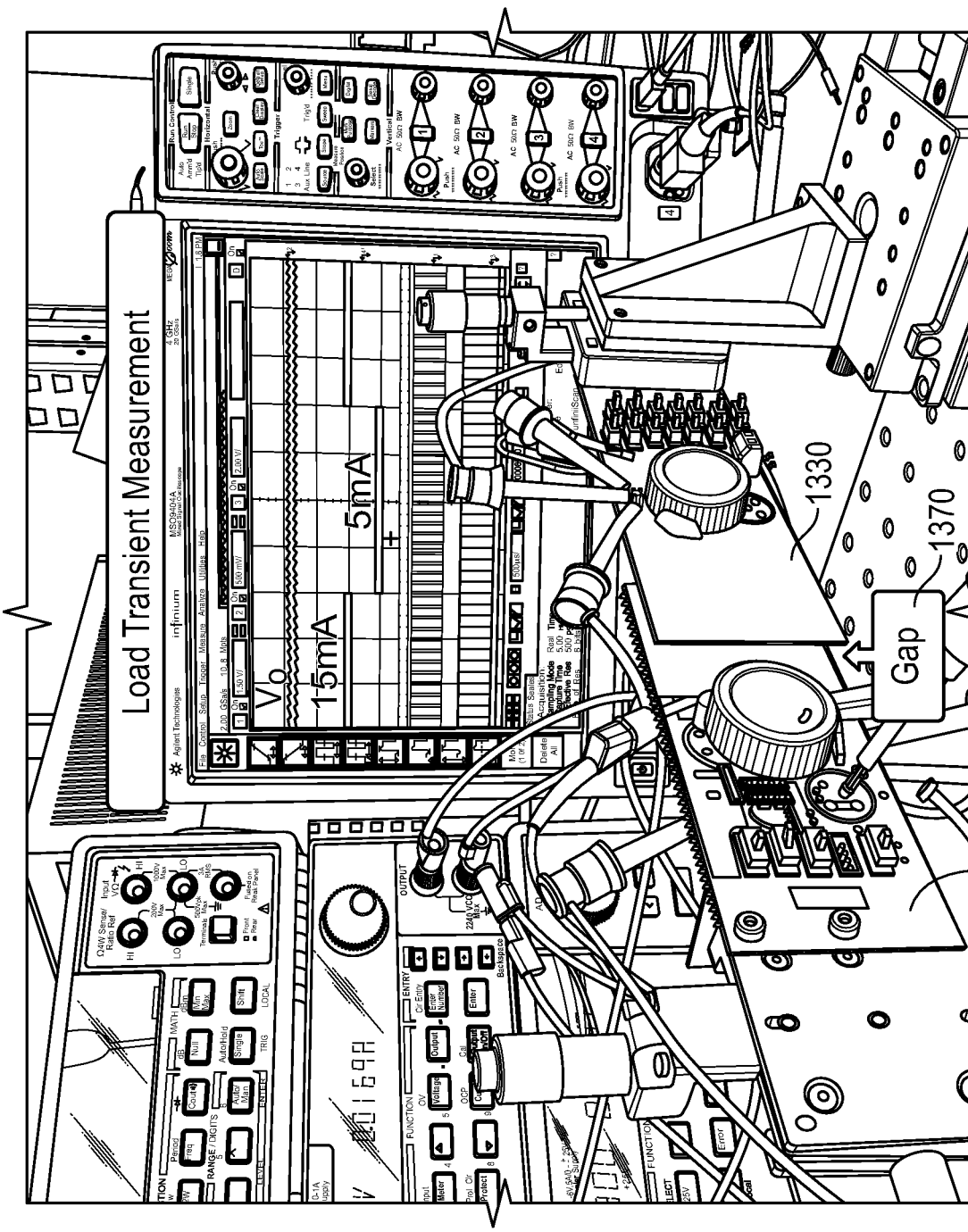
FIG. 13 shows an experimental setup of a receiver printed circuit board separated by a gap from a transmitter printed circuit board that was used to examine the current design associated with FIGS. 1, 2, and 5, in accordance with various embodiments.

Both TX and RX chips can be fabricated in a complementary metal-oxide-semiconductor (CMOS) process such as but not limited to a 180 nm CMOS process. FIG. 11 shows a photo of a TX chip 1130 and a RX chip 1105 that can be implemented similar to TX 530 of FIG. 5 and RX 205 of FIG. 2 with example sizes. Devices similar to TX 530 and RX 205 can be implemented in other sizes. FIG. 12 illustrates sizes of TX coil 1202 and RX coil 1204 that can be used with TX 530 and RX 205. In an example, coil parameters were measured for these coils with a network analyzer at 6.78 MHz. The parameters of TX coil 1202 include an inductance $L_{TX}$ of approximately 2.06 µH with a $Q_{TX}$ of approximately 113.65. The parameters of RX coil 1204 include inductance $L_{RX}$ of approximately 587.6 nH with a $Q_{RX}$ of approximately 96.48. The diameter, geometry, and material of the coil design can be different based on different applications of the associated WPT system. FIG. 13 shows an experimental setup of a RX printed circuit board (PCB) 1305 separated by a gap 1370 from a TX PCB 1330 that was used to examine the current design. RX PCB 1305 can include RX 205 of FIG. 2 and TX PCB 1330 can include TX 530 of FIG. 5. The setup can be different with different alignment, distance, and rotation angle conditions, as well as different media such as skin and materials with different dielectrics in between the TX and RX PCBs.

Figure 14:
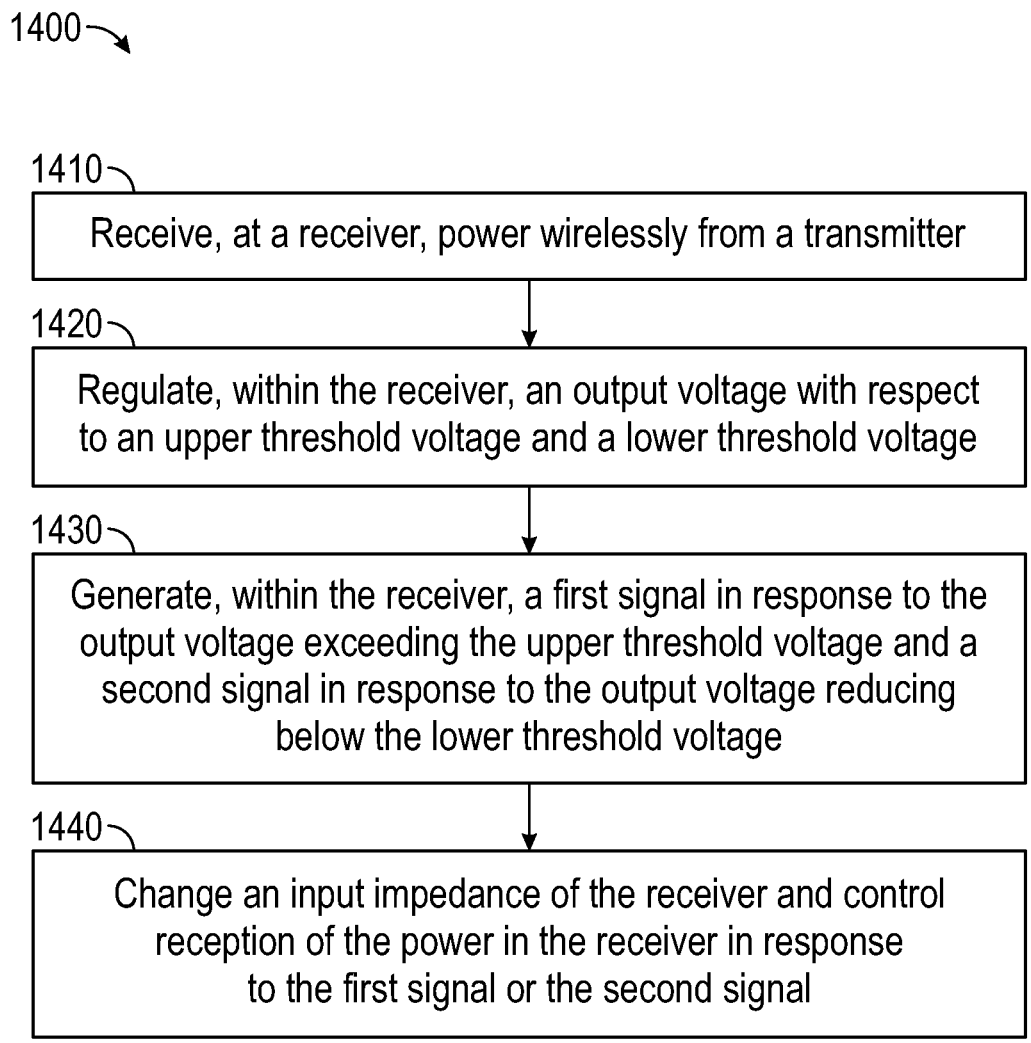
FIG. 14 is a flow diagram of features of an example method of wireless power and voltage regulation for wireless power transfer systems, in accordance with various embodiments.

FIG. 14 is a flow diagram of features of an example method of wireless power and voltage regulation for wireless power transfer systems. At 1410, power is received at a receiver wirelessly from a transmitter. At 1420, an output voltage to a load is regulated within the receiver with respect to an upper threshold voltage and a lower threshold voltage. At 1430, a first signal is generated within the receiver in response to the output voltage exceeding the upper threshold voltage. A second signal is generated in response to the output voltage reducing below the lower threshold voltage.

At 1440, the input impedance of the receiver is changed. Reception of the power in the receiver is controlled in response to the first signal or the second signal. The power transmitted to the receiver will be provided by adjustments within the transmitter in response to the first signal or the second signal generated in the receiver. The change of the input impedance of the receiver is reflected at the transmitter, causing a change in current in a power transistor of the transmitter and transmitter coil. A current sensor of the transmitter can sense the current change in the transmitter and the transmitted power is adjusted based on the current change. Controlling reception of the power from input nodes of the receiver can include using the first signal to switch a transistor arranged in parallel with input nodes of the receiver to change the input impedance of the receiver and the reflected impedance in the transmitter. Controlling reception of the power from input nodes of the receiver can include using the second signal to switch the transistor to change the input impedance of the receiver and the reflected impedance in the transmitter. Switch arrangements other than a transistor can be used to change the input impedance in the receiver. To generate LSK signals, the parallel transistor in the receiver turns on for different short periods to change the impedance. The switch turns on to reduce the impedance so that the associated transmitter can pick up the signal.

Variations of method 1400 or methods similar to method 1400 can include a number of different embodiments that can be combined depending on the application of such methods and/or the architecture of systems in which such methods are implemented. Such variations can include driving, within the transmitter, current to output nodes of the transmitter to a transmitter coil connected to the transmitter to transmit the power wirelessly to the receiver. The current delivered to the output nodes can be sensed within the transmitter, either using integrated circuits or discrete components. Based on sensing the current, a receiver-under-power signal or a receiver-over-power signal can be recovered/generated within the transmitter. Using the receiver-under-power signal or the receiver-over-power signal, the driving of the current can be adjusted. Generating a low-mode signal within the transmitter can cause an output power transistor driving the current to the output node to only turn on once every three consecutive cycles. Other pulse skipping intervals can be implemented depending on the application. These numbers can be adjustable based on application, coupling conditions, and number of boundaries. A method of wireless power transfer can include one or more combinations of procedures of the methods taught herein.

In various embodiments, a receiver can be configured to receive power in a wireless transfer with a transmitter. The receiver can include input nodes to receive power wirelessly from a transmitter and an output node to provide an output voltage to a load operatively connected to the output node. The receiver can include a local voltage regulator to regulate the output voltage with respect to an upper threshold voltage and a lower threshold voltage and a signal generator to generate a first signal in response to the output voltage reaching the upper threshold voltage and a second signal in response to the output voltage reducing to the lower threshold voltage. The receiver can include a circuit to change the input impedance of the receiver and to control reception of power received wirelessly from a transmitter in response to the first signal or the second signal. The circuit can be realized in a number of different designs such as but not limited to a transistor. The transistor can be a PMOS transistor, which can be a relatively large transistor to provide a lower impedance.

Variations of such a receiver or similar receivers can include a number of different embodiments that can be combined depending on the application of such receivers and/or the architecture of systems in which such receivers are implemented. Such variations can include the local voltage regulator having an error amplifier or a comparator to compare a comparison voltage to the upper threshold voltage or the lower threshold voltage, where the comparison voltage is generated from the output voltage. The comparison voltage can be generated to be a fraction of the output voltage. The comparison voltage generated by using a voltage divider with the output voltage being the input to provide the comparison voltage as a divided output voltage. Other techniques can be used to provide the divided version of the output voltage.

Variations of such a receiver or similar receivers can include the signal generator of the receiver implemented to include a load-shift-keying signal generator. The load-shift-keying signal generator can be implemented as a rising edge detector and pulse generator for load-shift-keying signal generation. The receiver can be designed on an integrated chip separate from a structure on which the transmitter is designed.

In various embodiments, a transmitter can be configured to transmit power in a wireless transfer with a receiver. The transmitter can include an integrated current sensor to sense current in a driver of the transmitter and a power modulator arranged to provide an input signal to the driver based on the sensed current. The power modulator can be, but is not limited to, a transmitter pulse-skipping power modulator. Variations of such a transmitter or similar transmitters can include a number of different embodiments that can be combined depending on the application of such transmitters and/or the architecture of systems in which such transistors are implemented. Such variations can include different sensing topologies, with implementation in integrated circuits (chips) or using discrete components, with the current sensor(s) sensing the current in an output PMOS of the driver, an output NMOS of the driver, or the TX coil. Variations of such a transmitter or similar transmitters can include the transmitter having a power modulation circuitry, in which different methodologies such as pulse-skipping, variable duty-cycle, and variable voltage can be used, to adjust the power that is transmitted from the transmitter.

In various embodiments, a wireless power transfer system can be designed to meet the specifications for a particular application for which wireless transfer of power is an integral part. The wireless power transfer system can include a receiver coil, a receiver, a transmitter, and a transmitter coil. The receiver can be connected to the receiver coil to wirelessly receive power. The receiver can have a local voltage regulator to regulate an output voltage of the receiver, where the output voltage is regulated with respect to an upper threshold voltage and a lower threshold voltage. The output voltage can be provided to a load for the given application. The transmitter can be structured to generate the power to the receiver. The transmitter can have a current sensor to detect a current in the transmitter, where the current is responsive to the receiver adjusting an amount of power wirelessly received in response to the output voltage of the receiver exceeding the upper threshold voltage in the receiver and in response to the output voltage reducing below the lower threshold voltage in the receiver. The transmitter coil can be connected to outputs of the transmitter, where the transmitter coil can be separated from the receiver coil by an insulating dielectric. The insulating dielectric can be skin of a subject, with the receiver implanted below the skin in the subject and the transmitter disposed outside the skin of the subject. Other applications can include the insulating dielectric being air, a vacuum, or insulating dielectric other than skin, for example in a non-implantation application.

Variations of such a wireless power transfer system or similar wireless power transfer systems can include a number of different embodiments that can be combined depending on the application of such wireless power transfer systems and/or the architecture of applications in which such wireless power transfer systems are implemented. Such variations can include the receiver of such a wireless power transfer system realized similar in structure or operation to RX 105 of FIG. 1, RX 205 of FIG. 2, or variations thereof. Such variations can include the transmitter of such a wireless power transfer system realized similar in structure or operation to TX 130 of FIG. 1, TX 230 of FIG. 2, or variations thereof.

A method of forming a wireless power transfer system can include comprising forming the wireless power transfer system by using one or more components associated with the receiver, the transmitters, and the wireless power transfer systems as taught herein. Forming the wireless power transfer system can include forming one or more of the components using semiconductor processing, which can include using a complementary metal-oxide-semiconductor process.

For a given application, a system can include one or more combinations of components of the receivers, the transmitters, and the wireless power transfer systems as taught herein. Such one or more combinations can operatively perform the operations of methods as taught herein. Such a system can include one or more permutations of components disclosed herein, associated components, or similar components. A machine-readable storage device storing instructions, that when executed by one or more processors, can cause a machine to perform operations, where the instructions include operations to simulate components of the receivers, the transmitters, the wireless power transfer systems, or combinations thereof, to simulate performance of the operations of methods disclosed herein, or to simulate combinations thereof.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description.

What is claimed is:

1. A wireless power transfer system comprising:
    a receiver coil;
    a receiver connected to the receiver coil to wirelessly receive power, the receiver having a local voltage regulator to regulate an output voltage of the receiver, the output voltage regulated with respect to an upper threshold voltage and a lower threshold voltage;
    a transmitter to generate the power, the transmitter having:
        a current sensor to detect a current in the transmitter, the current responsive to the receiver adjusting an amount of power wirelessly received in response to the output voltage exceeding the upper threshold voltage and in response to the output voltage reducing below the lower threshold voltage; and
        a power modulator to regulate the power generated using a comparison of the current detected by the current sensor with a reference correlated to the upper threshold voltage and a comparison of the current detected by the current sensor with a reference correlated to the lower threshold voltage; and
    a transmitter coil connected to outputs of the transmitter, the transmitter coil to transfer the power received by the receiver, the transmitter coil separated from the receiver coil by an insulating dielectric.

2. The wireless power transfer system of claim 1, wherein the insulating dielectric is skin of a subject, with the receiver implanted below the skin in the subject, and the transmitter disposed outside the skin of the subject.

3. The wireless power transfer system of claim 1, wherein the receiver includes:
    a signal generator to generate a first signal in response to the output voltage exceeding the upper threshold voltage and a second signal in response to the output voltage reducing below the lower threshold voltage; and
    a circuit to change an input impedance of the receiver and to control reception of the power received wirelessly from the transmitter in response to the first signal or the second signal.

4. The wireless power transfer system of claim 3, wherein the receiver is arranged to generate the first signal by substantially changing the input impedance of the receiver, and to generate the second signal by substantially changing the input impedance of the receiver, the first signal being different from the second signal.

5. The wireless power transfer system of claim 3, wherein the signal generator is implemented as a rising or falling edge detector and a pulse generator for load-shift-keying signal generation.

6. The wireless power transfer system of claim 1, wherein the local voltage regulator includes:
    a first comparison circuit to compare a comparison voltage to the upper threshold voltage, the comparison voltage generated from the output voltage; and
    a second comparison circuit to comparator to compare the comparison voltage to the lower threshold voltage.

7. The wireless power transfer system of claim 1, wherein the transmitter includes:
    a driver arranged to provide a drive current to the transmitter coil; and
    the power modulator arranged to provide an input signal to the driver or a supply voltage of the transmitter based on the current sensor sensing the current in the driver.

8. The wireless power transfer system of claim 7, wherein the power modulator is arranged to change a duty cycle of the driver.

9. The wireless power transfer system of claim 7, wherein the power modulator is arranged to control variation of the supply voltage.

10. The wireless power transfer system of claim 7, wherein the power modulator is structured to direct operation of the driver to a lower-power mode or a higher-power mode based on a sensed voltage from sensing the current.

11. The wireless power transfer system of claim 10, wherein the driver includes an output p-channel power transistor to receive an input from the power modulator to only turn on some switching cycles, operate with reduced duty cycle, or operate with lower supply voltage in the lower-power mode.

12. The wireless power transfer system of claim 7, wherein the current sensor is coupled to an output of the driver to sense a current in a high-side p-channel metal-oxide-semiconductor transistor of the driver, a current in a low-side n-channel metal-oxide-semiconductor transistor of the driver, or a transmitter coil current, with the high-side p-channel metal-oxide-semiconductor transistor, the low-side n-channel metal-oxide-semiconductor transistor and the transmitter coil coupled to the output of the driver.

13. The wireless power transfer system of claim 7, wherein the power modulator is arranged to adjust the power transmitted wirelessly to the receiver by skipping pulses to reduce the transmitted power, by operating continuously to transmit full power, by increasing a duty cycle to increase the transmitted power, or by reducing the duty cycle to reduce the transmitted power.

14. The wireless power transfer system of claim 7, wherein the power modulator is connected to receive a signal source from a voltage-controlled oscillator and a control signal generated from a sensed voltage from the current sensor and is connected to the driver to provide a clock to the driver, directing operation of the driver to a lower-power mode or a higher-power mode based on the sensed voltage.

15. The wireless power transfer system of claim 1, wherein the transmitter is implemented in a chip separate from the receiver.

16. The wireless power transfer system of claim 15, wherein the transmitter coil is separate from the chip.

17. The wireless power transfer system of claim 1, wherein the receiver is implemented in a chip separate from the transmitter.

18. A wireless power transfer system comprising:
    a receiver coil;
    a receiver connected to the receiver coil to wirelessly receive power, the receiver having a local voltage regulator to regulate an output voltage of the receiver, the output voltage regulated with respect to an upper threshold voltage and a lower threshold voltage;
    a transmitter to generate the power, the transmitter having a current sensor to detect a current in the transmitter, the current responsive to the receiver adjusting an amount of power wirelessly received in response to the output voltage exceeding the upper threshold voltage and in response to the output voltage reducing below the lower threshold voltage; and a transmitter coil connected to outputs of the transmitter, the transmitter coil to transfer the power received by the receiver, the transmitter coil separated from the receiver coil by an insulating dielectric, wherein the transmitter includes:
  a driver arranged to provide a drive current to the transmitter coil; and
  a power modulator arranged to provide an input signal to the driver or a supply voltage of the transmitter based on the current sensor sensing the current in the driver, wherein the power modulator includes:
  a first comparator to compare a sensed voltage from the current sensor to a high reference transmission voltage;
  a second comparator to compare the sensed voltage from the current sensor to a low reference transmission voltage; and
  a multiplexer connected to an output of the first comparator and an output of the second comparator, the multiplexer to provide a control signal to adjust the power to transfer.

19. The wireless power transfer system of claim 18, wherein the transmitter includes:
  control logic; and
  a second multiplexer coupled to the control logic and the multiplexer, the second multiplexer coupled to an input of the driver.

20. The wireless power transfer system of claim 19, wherein the driver is a class D non-overlapping driver.

* * * * *